US010362081B2

(12) United States Patent
Parthasarathy

(10) Patent No.: US 10,362,081 B2
(45) Date of Patent: Jul. 23, 2019

(54) METHODS AND SYSTEMS FOR QUANTIFYING THE HOLISTIC QUALITY OF EXPERIENCE FOR INTERNET MULTIMEDIA

(71) Applicant: Citrix Systems, Inc., Fort Lauderdale, FL (US)

(72) Inventor: Kannan Parthasarathy, Palo Alto, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 684 days.

(21) Appl. No.: 14/015,866

(22) Filed: Aug. 30, 2013

(65) Prior Publication Data
US 2015/0067184 A1    Mar. 5, 2015

(51) Int. Cl.
*H04L 12/24* (2006.01)
*H04L 12/26* (2006.01)
(Continued)

(52) U.S. Cl.
CPC .......... *H04L 65/60* (2013.01); *H04L 41/5009* (2013.01); *H04L 41/5067* (2013.01); *H04L 43/08* (2013.01); *H04L 65/80* (2013.01); *H04N 21/24* (2013.01); *H04N 21/44004* (2013.01); *H04N 21/44209* (2013.01); *H04N 21/64723* (2013.01)

(58) Field of Classification Search
CPC ......... H04L 65/60; H04L 65/80; H04L 43/08; H04L 41/5009; H04L 41/5067
See application file for complete search history.

(56) References Cited

U.S. PATENT DOCUMENTS

| 7,403,487 B1 | 7/2008 | Foladare et al. |
| 2002/0065911 A1 | 5/2002 | Von Klopp et al. |

(Continued)

FOREIGN PATENT DOCUMENTS

| EP | 2480001 A2 | 7/2012 |
| EP | 2530870 A1 | 12/2012 |

(Continued)

OTHER PUBLICATIONS

Notification of Transmittal of The International Search Report and The written Opinion of the International Searching Authority, or the Declaration issued in PCT Application No. PCT/US2013/034708; dated Jul. 26, 2013; (2 pages).

(Continued)

*Primary Examiner* — Aaron N Strange
(74) *Attorney, Agent, or Firm* — Allen, Dyer, Doppelt & Gilchrist, PA

(57) ABSTRACT

A system and method is provided for providing a composite Quality of Experience (QoE) metrics associated with a multimedia transmitted via a network. The method includes obtaining multimedia data corresponding to the multimedia transmitted via the network and acquiring metrics associated with the multimedia data. The metrics includes at least one multimedia transmitting metrics and at least one multimedia quality metrics. The method also includes normalizing the metrics and determining, based on the one or more normalized metrics, the composite multimedia QoE metrics.

19 Claims, 5 Drawing Sheets

(51) Int. Cl.

| | |
|---|---|
| *H04L 29/06* | (2006.01) |
| *H04N 21/24* | (2011.01) |
| *H04N 21/442* | (2011.01) |
| *H04N 21/647* | (2011.01) |
| *H04N 21/44* | (2011.01) |

(56) References Cited

U.S. PATENT DOCUMENTS

| | | | |
|---|---|---|---|
| 2002/0120727 A1 | 8/2002 | Curley et al. | |
| 2003/0005113 A1 | 1/2003 | Moore | |
| 2003/0147466 A1* | 8/2003 | Liang | H04N 19/149 375/240.12 |
| 2005/0071307 A1 | 3/2005 | Snyder | |
| 2006/0056323 A1* | 3/2006 | Currivan | H04J 3/0632 370/278 |
| 2006/0056460 A1* | 3/2006 | Currivan | H04J 3/0682 370/503 |
| 2007/0061339 A1 | 3/2007 | Douglet | |
| 2009/0088188 A1 | 4/2009 | Wormald et al. | |
| 2009/0122887 A1* | 5/2009 | Li | H04L 5/0046 375/260 |
| 2010/0020717 A1* | 1/2010 | McGregor | H04B 17/309 370/252 |
| 2010/0269044 A1* | 10/2010 | Ivanyi | G06Q 30/02 715/736 |
| 2011/0271309 A1 | 11/2011 | Chetlur et al. | |
| 2011/0320607 A1* | 12/2011 | Harrang | H04W 4/028 709/226 |
| 2012/0110167 A1 | 5/2012 | Joch et al. | |
| 2012/0117225 A1* | 5/2012 | Kordasiewicz | H04L 65/1083 709/224 |
| 2012/0140624 A1 | 6/2012 | Denman et al. | |
| 2012/0188882 A1* | 7/2012 | Wilkinson | H04L 41/5067 370/252 |
| 2012/0191841 A1 | 7/2012 | Swamidas et al. | |
| 2012/0246310 A1 | 9/2012 | Broda et al. | |
| 2012/0254102 A1* | 10/2012 | Li | G06Q 10/10 706/58 |
| 2012/0311126 A1* | 12/2012 | Jadallah | H04L 41/5067 709/224 |
| 2013/0031575 A1* | 1/2013 | Gallant | H04L 41/5038 725/20 |
| 2013/0041998 A1* | 2/2013 | Kordasiewicz | H04H 60/33 709/224 |
| 2013/0182579 A1 | 7/2013 | Turgeon et al. | |
| 2013/0198322 A1* | 8/2013 | Oran | H04L 67/322 709/217 |
| 2013/0219048 A1 | 8/2013 | Arvidsson et al. | |
| 2013/0223207 A1* | 8/2013 | Bouchard | H04L 47/26 370/229 |
| 2013/0242781 A1* | 9/2013 | Hui | H04W 52/0212 370/252 |
| 2013/0262659 A1 | 10/2013 | Parthasarathy et al. | |
| 2013/0263167 A1* | 10/2013 | Parthasarathy | H04L 41/5067 725/14 |
| 2013/0275615 A1* | 10/2013 | Oyman | H04L 65/60 709/231 |
| 2013/0317888 A1* | 11/2013 | Serrano | G06Q 10/0639 705/7.36 |
| 2014/0119196 A1* | 5/2014 | Hui | H04W 24/10 370/241 |
| 2014/0365677 A1* | 12/2014 | Mueller | H04L 65/80 709/231 |

FOREIGN PATENT DOCUMENTS

| | | |
|---|---|---|
| WO | WO 2003081883 | 10/2003 |
| WO | WO 2010100315 | 9/2010 |
| WO | WO 2011065692 | 6/2011 |
| WO | WO 2011119439 | 9/2011 |
| WO | WO-2012/055022 A1 | 5/2012 |
| WO | WO-2012/055023 A1 | 5/2012 |

OTHER PUBLICATIONS

International Search Report issued in PCT Application No. PCT/US2013/034708; dated Jul. 26, 2013; (3 pages).

Written Opinion of the International Searching Authority issued in PCT Application No. PCT/US2013/034708; dated Jul. 26, 2013; (3 pages).

PCT International Search Report; related to Application No. PCT/US2013/034713; dated Aug. 19, 2013 (3 pgs.).

PCT Written Opinion of the International Searching Authority; related to Application No. PCT/US2013/034713; dated Aug. 19, 2013 (4 pgs.).

PCT International Search Report and Written Opinion issued in International Application No. PCT/US2014/053588 dated Nov. 6, 2014; (9 pages).

Gahbiche Msakni, H. et al.; "Is QoE estimation based on QoS parameters sufficient for video quality assessment?"; 2013 9th International Wireless Communications and Mobile Computing Conference; Jul. 1, 2013 (pp. 538-544).

* cited by examiner

METHODS AND SYSTEMS FOR QUANTIFYING THE HOLISTIC QUALITY OF EXPERIENCE FOR INTERNET MULTIMEDIA

FIELD

The present disclosure generally relates to quality control of transmitting Internet video. Exemplary embodiments relate to methods and systems for quantifying the holistic Quality of Experience (QoE) associated with transmitting videos via a network.

BACKGROUND

An increasing number of network users today are streaming multimedia, such as videos, across the Internet. The multimedia streamed can range from short user-generated YouTube® videos to TV shows and full-length movies. As a result, video transmission has now become a large portion of the Internet traffic.

Unlike traditional video transmission infrastructures such as cable TV, the Internet is a shared medium among all users of the Internet and Internet data packets are transmitted on a best-effort basis. As such, the bandwidth available to a particular user of the Internet can be dynamically varying, depending on the activity of other Internet users that share the Internet. Moreover, users that access the Internet by using mobile communication devices may also suffer additional unpredictable variations of the bandwidth due to the dynamic nature of the wireless network.

In the context of watching an Internet video, such variations of the available bandwidth can cause frequent pauses of the video that is being played on a client mobile communication device due to the undesired buffering of the video. As a result, video playing can be stalled and the user's experience of watching the video can be degraded. While a number of current techniques can be used to reduce the video stalling, the current techniques often involves reducing the bitrate of the video to be below the available bandwidth so that the video can be played in real-time without stalling. Reducing the video bitrate can be performed either at the source of the content, such as at a content server, or at an intermediate gateway node. Reducing the video bitrate frequently involves some form of video compression, and thus can result in an undesired loss of video quality.

Often times, users' experiences of watching an Internet video is important to the service providers. Thus, the service providers frequently monitor and try to improve their users' experiences. By improving their users' experiences, the service providers can attract their users and potential users to their services.

BRIEF DESCRIPTION OF THE DRAWINGS

Reference will now be made to the accompanying drawings showing example embodiments of this disclosure. In the drawings.

DETAILED DESCRIPTION OF DRAWINGS

Reference will now be made in detail to the exemplary embodiments consistent with the embodiments disclosed herein, the examples of which are illustrated in the accompanying drawings. Wherever possible, the same reference numbers will be used throughout the drawings to refer to the same or like parts.

The present disclosure generally relates to quality control of transmitting Internet video. Exemplary embodiments relate to methods and systems for quantifying the holistic Quality of Experience (QoE) associated with transmitting videos via a network. Quantifying QoE gives service providers and content providers a method to quantitatively measure the QoE for Internet video in a manner that takes into account the quality of the video delivery as well as the picture quality.

Figure 1:
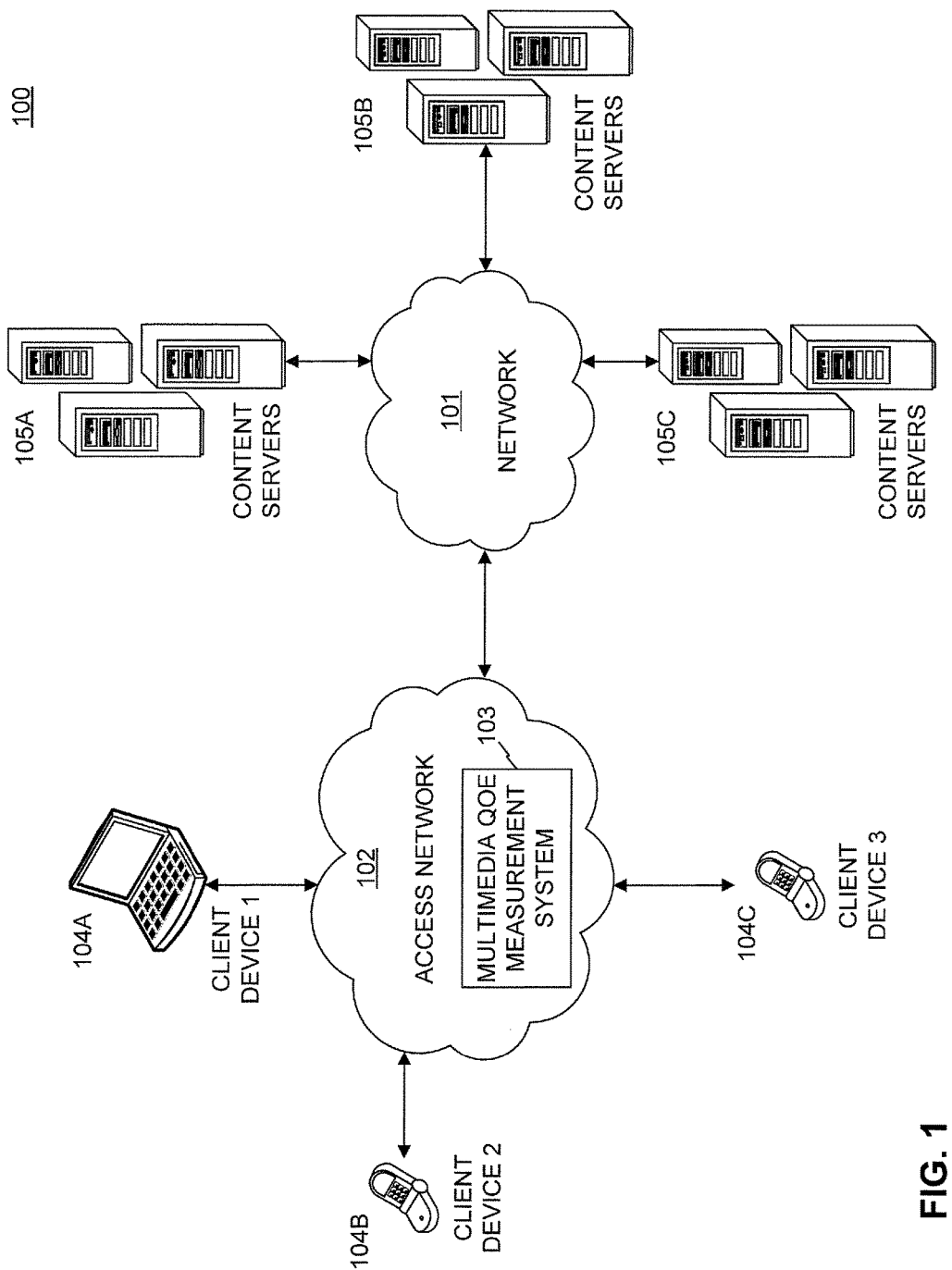
FIG. 1 is a block diagram of an exemplary network system, consistent with embodiments of the present disclosure.

FIG. 1 is a block diagram of an exemplary network system 100. Exemplary network system 100 can be any type of system that transmits data packets over a network. For example, the exemplary system 100 can include one or more networks transmitting data packets across wired or wireless networks from servers to client devices. The exemplary system 100 can include, among other things, network 101, access network 102, multimedia QoE measurement system 103, one or more client devices 104A-C, and one or more content servers 105A-C.

Network 101 can include any combination of wide area networks (WANs), local area networks (LANs), or wireless networks suitable for packet-type communications. In some exemplary embodiments, network 101 can be, for example, Internet and X.25 networks. Network 101 can communicate data packets with access network 102 and with one or more content servers 105A-C.

Access network 102 can include one or more radio networks, one or more cellular networks, one or more wide area networks (WANs), one or more local area networks (LANs), wireless networks suitable for packet-type communications, or any combination thereof. Access network 102 can be operated by, for example, service providers such as DSL service provides (e.g., AT&T®), broadband service providers (e.g., Comcast®), and numerous cellular service provides (e.g., AT&T®, Sprint®, and Verizon®). Access network 102 can employ technologies including digital subscriber line (DSL), cable broadband, 802.11 Wi-Fi, Global System for Mobile Communication (GSM), Universal Mobile Telecommunications System (UMTS) adopting Wideband Code Division Multiple Access (W-CDMA) radio access technology, CDMA2000, Worldwide Interoperability for Microwave Access (WiMax) and Long Term Evolution (LTE). For example, in some embodiments, access network 102 can be a General Packet Radio Service (GPRS) core network, which provides mobility management, session management and transport for Internet Protocol packet services in GSM and W-CDMA networks. One or more client devices (e.g., 104A-C) can communicate with access network 102, which in turn communicates with one or more content servers 105A-C directly or indirectly through network 101. The exemplary network 102 can include, among other things, multimedia QoE measurement system 103.

As shown in FIG. 1, multimedia QoE measurement system 103 can be deployed at one or more locations within access network 102. Multimedia QoE measurement system 103, however, is not limited to be located within the access network 102. Rather, it can be implemented at any intermediate nodes within the communication system 100. In some embodiments of access network 102, multimedia QoE measurement system 103 can be incorporated in a gateway node that has visibility into data traffic between all client devices and content servers. For example, in the case of a mobile broadband access network using GSM or UMTS technology, multimedia QoE measurement system 103 can be located at any intermediate nodes including Traffic Optimization Platforms (TOP), Deep Packet Inspection (DPI) nodes, and other gateway nodes such as the Gateway GPRS Support Node (GGSN). A TOP can perform web and video compression. A DPI node can examine the header (and possibly also the data part) of a packet as it passes an inspection point, searching for protocol non-compliance, viruses, spam, intrusions, or defined criteria to decide whether the packet may pass or if it needs to be routed to a different destination, or, for the purpose of collecting statistical information. A GGSN can be responsible for the interworking between the GPRS network and external packet switched networks, such as the Internet and X.25 networks.

Multimedia QoE measurement system 103 is not limited to be located at the above exemplary nodes. In some embodiments, multimedia QoE measurement system 103 can also be implemented on any one or more gateway nodes that convert formatted data provided in one type of network to a particular format required for another type of network, or any other intermediate nodes if desired. A gateway node, for example, may be a server, a router, a firewall server, a host, or a proxy server. Much like a content server, an HTTP proxy server can accept target URLs within a client's browser window, process the request, and then display the contents of the requested URLs immediately back within the client's browser. In some embodiments, the HTTP proxy servers can be explicit HTTP proxy servers (e.g. Wireless Application Protocol (WAP) Gateways) that process web pages or transparent HTTP proxy servers such as those in traffic management and optimization platforms. A gateway node may be capable of processing webpage, image, audio, video, and T.120 transmissions alone or in any combination, and is capable of full duplex media translations.

Multimedia QoE measurement system 103 can process any packet type communications including multimedia data, such as audio data, video data, graphical data, or any combination thereof. Multimedia data transmission can be, for example, part of Transport Control Protocol (TCP) transactions. TCP transactions can include TCP requests from one or more client devices 104A-C and TCP responses from one or more content servers 105A-C. As an example, through one or more TCP transactions, a client device (such as client device 104A) can request multimedia data (e.g., a video clip) stored on a content server (e.g., content server 105A); and the content server can respond to the request by transmitting the multimedia data to the client device, which then acknowledges the receipt of the multimedia data. When multimedia QoE measurement system 103 is deployed on an intermediate node (e.g., a gateway node in access network 102) that is located between the client device and the content server, it can process the multimedia data by, for example, obtaining, measuring, extracting, and storing a variety of transactional events and parameters associated with the multimedia data. It is appreciated that multimedia QoE measurement system 103 can process multimedia data transmitted by more than one content server. In some embodiments, multimedia QoE measurement system 103 can be deployed on a particular content server and thus can process the multimedia data transmitted from that particular content server. Multimedia QoE measurement system 103 will be further described below in detail.

One or more client devices 104A-C can be devices or applications, either in hardware or software, that communicate with access network 102. One or more client devices 104A-C can be, for example, mobile handheld devices, laptop computers, netbook devices, smart phone devices, tablets, web TV equipment, gaming devices such as Microsoft Xbox® series devices, Nintendo Wii™ series devices, and Sony PlayStation® series devices, or any other devices or applications that can communicate with a network. While it is appreciated that that one or more client devices 104A-C can include wired devices, one or more client devices 104A-C are typically wireless devices since the quality of experience for users of wireless devices tends to fluctuate more based on the variation in one or more networks bandwidths and the number of subscribers using those networks. One or more client devices 104A-C can make requests to and receive responses from one or more content servers 105A-C through access network 102 and network 101.

One or more content servers 105A-C can be any computer systems or software programs that are capable of serving the requests of clients, e.g., one or more client devices 104A-C. One or more content servers 105A-C can be any types of servers including content servers, application servers, communication servers, database servers, proxy servers, web servers, caching servers, and any other suitable servers. One or more content servers 105A-C can store and provide, among other things, multimedia data. Any requested multimedia data can be provided by one or more content servers. One or more content servers 105 can communicate with one or more client devices 104 through network 101 and access network 102.

Figure 2:
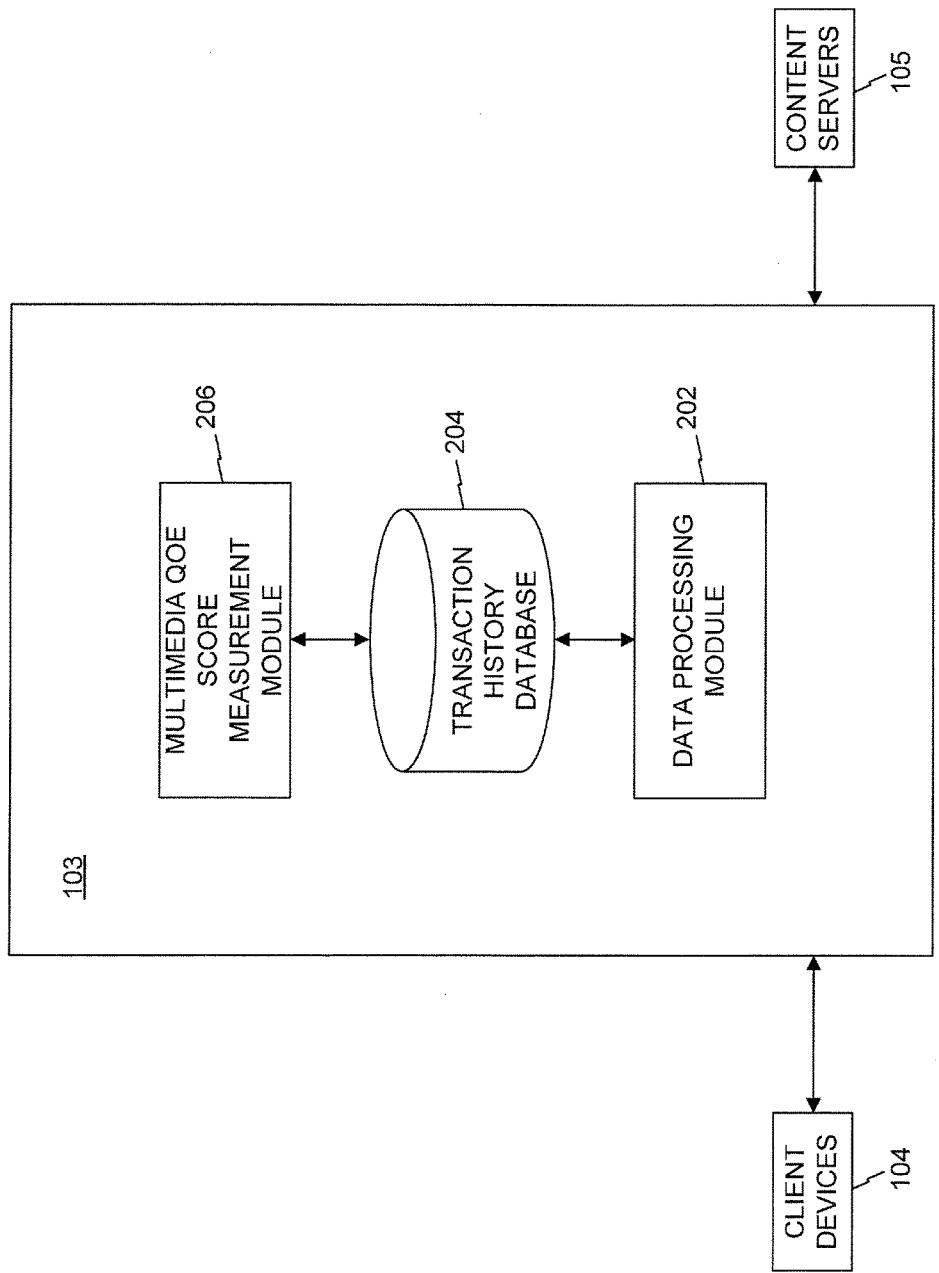
FIG. 2 is a simplified block diagram illustrating an embodiment of an exemplary multimedia QoE measurement system shown in FIG. 1, consistent with embodiments of the present disclosure.

FIG. 2 is a simplified block diagram illustrating an embodiment of an exemplary multimedia QoE measurement system 103 shown in FIG. 1. Multimedia QoE measurement system 103 can include, among other things, a data processing module 202, a transaction history database 204, and a multimedia QoE score measurement module 206. Multimedia QoE measurement system 103 can have one or more processors and at least one memory for storing program instructions. The processor(s) can be a single or multiple microprocessors, general purpose processors, graphical processors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods can be implemented in hardware components or combinations of hardware and software such as, for example, ASICs and special purpose computers.

Multimedia QoE measurement system 103 can communicate with one or more one or more client devices 104 and one or more content servers 105, either directly or indirectly. In some embodiments, multimedia QoE measurement system 103 can be part of an adaptive traffic manager that performs traffic monitoring and optimization, for example, the adaptive traffic manager described in application Ser. No. 13/436,658 titled "Adaptive Traffic Management in Cellular Wireless Networks," which is herein incorporated by reference by its entirety.

Multimedia QoE measurement system 103 can include data processing module 202. Data processing module 202 can be responsible for routing data traffic and handling data packets between one or more client devices 104 and one or more content servers 105. For example, data processing module 202 can process multimedia data that is transmitted through a network, such as video clips, web TV (or Internet Protocol TV), P2PTV, webcasting, and streaming videos. Multimedia data can also be a portion of the video clips, web TV (or Internet Protocol TV), P2PTV, webcasting, and streaming videos. Data processing module 202 can be a software program and/or a hardware device. Data processing module 202 can also perform multimedia data processing such as audio compression, video compression, filtering, frame rate conversion, noise reduction, etc. Data processing module 202 can store multimedia data, either processed or unprocessed, in transaction history database 204.

Transaction history database 204 can store multimedia data, either processed or unprocessed by data processing module 202. The multimedia data stored corresponds to the multimedia data that are transmitted between one or more client devices 104 and the one or more content servers 105. In some embodiments, transaction history database 206 can also store transactional events and parameters, user experience metrics, normalized user experience metrics, and the composite multimedia QoE metrics. The information stored in transaction history database 204 can be provided by, for example, data processing module 202, multimedia QoE score measurement module 206 of multimedia QoE measurement system 103. Transaction history database 204 can store and organize its information based on per client device, per subscriber (user), per organization, per network, per service provider, per multimedia data, per content server, or any combination thereof. For example, if multimedia QoE measurement system 103 provides a QoE analysis for each client device, transaction history database 204 can be organized according to each client device via its phone number, MAC address, etc. The information stored in transaction history database 204 is described below in detail. Transaction history database 204 can be a software program and/or a hardware device and can be located local to or remote from multimedia QoE measurement system 103.

Multimedia QoE score measurement module 206 can acquire, for example by computing, user experience metrics associated with multimedia data. The user experience metrics can include, among other things, multimedia transmitting metrics and multimedia quality metrics. The multimedia transmitting metrics can include, for example, a multimedia smoothness index and a multimedia start delay. The multimedia quality metrics can include a multimedia bitrate, a video frame size, and video frame rate. The multimedia transmitting metrics and the multimedia quality metrics can be used to determine a composite multimedia QoE metrics and will be further described in details below. It is appreciated that the user experience metrics can also include any other metrics that is desired.

In some embodiments, multimedia QoE score measurement module 206 can also acquire the user experience metrics based on per client device, per subscriber (user), per organization, per network, per service provider, per multimedia data, per time period, per content server, or any combination thereof. As an example, if multimedia QoE score measurement module 206 acquires the user experience metrics for each client device, the acquisition can be performed according to each client device via its phone number, MAC address, etc. As another example, multimedia QoE score measurement module 206 can acquire the user experience metrics corresponding to each multimedia data requested by client devices that use a same service provider. The user experience metrics can thus be further processed to generate one or more composite multimedia QoE metrics that can be provided to the service provider for monitoring or improving the quality of service.

In some embodiments, multimedia QoE score measurement module 206 can also acquire user experience metrics associated with a small amount of multimedia data (e.g., a 5-minute video clip), a large amount of multimedia data (e.g., a 2-hour Internet movie), or multimedia data that are transmitted to a client device during a history period. For example, multimedia QoE score measurement module 206 can acquire user experience metrics associated with multimedia data that a client device requested during a history period of the past 5 minutes. Multimedia QoE score measurement module 206 can be a software program and/or a hardware device.

As described above, the user experience metrics can include, among other things, multimedia transmitting metrics and multimedia quality metrics. The multimedia transmitting metrics can include, for example, a multimedia smoothness index and a multimedia start delay. The multimedia smoothness index can be acquired by measuring the stalling time relative to the media time of the multimedia data. The stalling time is, for example, the amount of stalling a client device experiences while playing the multimedia data. The stalling time can be defined, for example, as:

$$\text{stalling time} = \begin{cases} 0, & \text{if media time} \geq \text{elapsed time} \\ (\text{elapsed time} - \text{media time}), & \text{otherwise} \end{cases} \quad (1)$$

In the above exemplary definition of the stalling time, the elapsed time can be the time for transmitting the multimedia data from a content server to a client device. The elapsed time is sometimes also referred to as the wall-clock time. The multimedia data transmitted during the elapsed time can be, for example, a full video clip or a portion of it. The multimedia data can be transmitted by one or more of the content servers using, for example, TCP connections or any other connections that implements an acknowledgement or similar function.

As an example, in FIG. 2, one or more client devices 104 can send a request of the multimedia data to one or more content servers 105, and one or more content servers 105 can transmit the multimedia data to one or more client devices 104 and subsequently receive an acknowledgement from one or more client devices 104 for receipt of the multimedia data. Because one or more client devices 104 communicate with one or more content servers 105 via multimedia QoE measurement system 103 located in access network 102, multimedia QoE measurement system 103 can thus process and store the transmitted multimedia data, record and/or extract transactional events and parameters, and obtain any other information that is desired. The transactional events and parameters can include, for example, the time that one or more content servers 105 start to transmit the multimedia data, the corresponding time that multimedia QoE measurement system 103 receives the transmitted multimedia data, the time that one or more client devices 104 send an acknowledgement for receipt of the multimedia data, and the time that multimedia QoE measurement system 103 receives the acknowledgement. The transmitted multimedia data, the transactional events and parameters, and any other desired information can be stored, for example, in transaction history database 204. Multimedia QoE score measurement module 206 can thus obtain the elapsed time based on the starting time and the acknowledgement time stored in transaction history database 204.

In the above exemplary definition of the stalling time, the media time can be the amount of playing time of the transmitted multimedia data. For example, the media time can be the length of the video clip if the entire video clip is transmitted. The media time can also be a portion of the video clip play time if only a portion of the video clip is transmitted. In the above exemplary definition of the stalling time, if the media time is greater than or equal to the elapsed time, the stalling time can be assigned a pre-determine value, such as "0." A stalling time of "0" can indicate that no stalling occurred for playing the multimedia data at the client device. If the media time is less than the elapsed time, the stalling time can equal the difference between the elapsed time and the media time (i.e., stalling time=elapsed time−media time). The multimedia smoothness index can then be acquired, for example, as the ratio of the stalling time and the media time:

$$\text{Multimedia Smoothness Index} = \frac{\text{stalling time}}{\text{media time}}. \quad (2)$$

In the above exemplary definition of the multimedia smoothness index, the multimedia smoothness index can have a value in the range from 0 to infinity. A value "0" can indicate that no stalling occurred and a large multimedia smoothness index value can indicate that significant stalling occurred or is occurring.

As an example, in FIG. 2, one or more content servers 105 can transmit 10 minutes of multimedia data to one or more client devices 104 and the elapsed time (i.e., the time for transmitting the multimedia data to one or more client devices 104) is 15 minutes. The stalling time is therefore 5 minutes (i.e., 15 minutes elapses time−10 minutes media time). According to the example equation (2) above, the multimedia smoothness index would be 0.5.

As described above, multimedia QoE score measurement module 206 can also acquire a multimedia start delay. The multimedia start delay can be the delay from the time the client device requests the multimedia data to the time the client device starts to render or play the requested multimedia data, i.e., the amount of time between the client device receiving a play input to the time that the multimedia data is actually played. Similar to the elapsed time and the media time, the relevant timing information for acquiring multimedia start delay can be obtained by multimedia QoE measurement system 103 and stored in transaction history database 204. Multimedia QoE score measurement module 206 can then obtain the stored information from transaction history database 204 for acquiring the multimedia start delay. In some embodiments, the multimedia start delay can be acquired by, for example, measuring the amount of time for transmitting multimedia data having a fixed amount of media time. Typically, the client device can start to play the multimedia data after it receives a portion of it. As an example, after the client device requests multimedia data having a 5 minutes media time, it can start playing after receiving a portion of the requested multimedia data (e.g., 5 or 10 seconds media time). The multimedia start delay can be in a range, for example, from 0 to 1 second. In some embodiments, the multimedia start delay can be client-device specific. For example, an Android-based device may have a different multimedia start delay from an iPhone-based device.

As described above, multimedia QoE score measurement module 206 can also acquire multimedia quality metrics, such as a multimedia bitrate, a video frame size, and a video frame rate. The multimedia bitrate can be the average data rate for the client device to play the multimedia data in real time. The multimedia bitrate can be acquired based on size of the multimedia data (e.g., multimedia data in number of bytes) received at the client device and the media time. An exemplary definition of the multimedia bitrate can be:

$$\text{Multimedia Bitrate} = \frac{\text{size of the received multimedia data}}{\text{media time}}. \quad (3)$$

The multimedia bitrate can be measured in number of bits per second. For example, the multimedia data can have a multimedia bitrate of 300-800 kbps or a multimedia bitrate of 16 Mbps. In general, a higher multimedia bitrate indicates a better quality of the multimedia data. Similar to the other information as described above, the size of the received multimedia data and the media time can be obtained by multimedia QoE measurement system 103 and stored in transaction history database 204. Multimedia QoE score measurement module 206 can then obtain the stored information from transaction history database 204 for acquiring the multimedia bitrate.

Multimedia QoE score measurement module 206 can also acquire video frame size from data provided by one or more content servers 105, or if optimization is involved, by an optimization server (which may also provide multimedia QoE measurement system 103). The video frame size can be, for example, the total number of pixels in a single video frame. A video frame can be measured by the product of the width and the height of the video frame. For example, the video frame size can be the product of 1,280×720, 1,920× 1,080, 2,048×1,536, etc. The number of different video frame sizes used by the content providers can be between, for example, 4000 and 5000. Some video frame sizes that are commonly used can include 1,280×720 and 1,920×1,080. In some embodiments, the video frame size is the actual number of pixels in a video frame, i.e., the actual product of the width and height of the video frame, and is not limited to the commonly used video frame sizes. In general, a large video frame size can indicate a better image quality of the multimedia data. The multimedia data, the width and the height of the video frame, and any other desired parameters, can be obtained, by multimedia QoE measurement system 103 and stored in transaction history database 204. Multimedia QoE score measurement module 206 can then obtain the stored information from transaction history database 204 for acquiring the video frame size.

Multimedia QoE score measurement module 206 can also acquire video frame rate. The video frame rate can be the number of video frames transmitted to the client device in a unit time (e.g., per second). For example, the video frame rate can be 25p, 30p, 48p, 60p, and 72p, representing corresponding video frames per second in either a progressive format or an interlaced format. A large video frame rate can indicate a better image quality of the multimedia data. In some embodiments, the multimedia data transmitted via the network can have a fixed video frame rate, and thus multimedia QoE score measurement module 206 can acquire the video frame rate by obtaining the fixed video frame rate of the multimedia data. In some embodiments, multimedia data transmitted via the network can have a varying video frame rate. For example, a multimedia data can include two video clips that that have different video frame rates. Multimedia QoE score measurement module 206 can thus acquire the video frame rate by, for example, obtaining the various video frame rates and computing an average video frame rate.

The multimedia data, the fixed video frame rate, and the different video frame rates of a varying frame rate multimedia data can be obtained by multimedia QoE measurement system 103 and stored in transaction history database 204. Multimedia QoE score measurement module 206 can then obtain the stored information from transaction history database 204 for acquiring the video frame rate. While the above description relates to five exemplary user experience metrics, i.e., the multimedia smoothness index, the multimedia start delay, the multimedia bitrate, the video frame size and the video frame rate, it is appreciated that multimedia QoE score measurement module 206 can also acquire any other metrics. Moreover, multimedia QoE score measurement module 206 can acquire the one or more user experience metrics in any order that is desired.

In some embodiments, after acquiring the user experience metrics, multimedia QoE score measurement module 206 can also further process, such as normalize, the acquired one or more user experience metrics. For example, multimedia QoE score measurement module 206 can normalize the one or more user experience metrics for determining a composite multimedia QoE metrics, such as a single composite multimedia QoE score. The composite multimedia QoE metrics can provide a holistic view or measurement of the overall quality of service associated with multimedia transmission via the network. The composite multimedia QoE metrics can be provided to, for example, traffic monitoring and optimization platforms, such as the adaptive traffic manager as described above.

In some embodiments, for determining the composite multimedia QoE metrics, multimedia QoE score measurement module 206 can normalize the one or more user experience metrics in a balanced manner. As an example, multimedia QoE score measurement module 206 can normalize the one or more user experience metrics such that no one individual user experience metrics can influence the composite multimedia QoE metrics in an undesired way. That is, the impact of any one user experience metric is limited so that the composite multimedia QoE metrics represents a holistic view of the quality of service associated with the multimedia transmission via the network. Multimedia QoE score measurement module 206 can also normalize the one or more user experience metrics such that the one or more user experience metrics is limited within a predetermined range that can be readily interpreted or used. For example, multimedia QoE score measurement module 206 can normalize the one or more user experience metrics such that they all have a value in a predetermined range from 0 to 100. Exemplary normalizations performed by multimedia QoE score measurement module 206 are described in detail below. The normalized user experience metrics can also be stored, for example, in transaction history database 204.

In some embodiments, multimedia QoE score measurement module 206 can process, such as normalize, the multimedia transmitting metrics using an exponential decay model. As an example, multimedia QoE score measurement module 206 can normalize the multimedia smoothness index using an exemplary exponential decay model as:

$$f(x) = 100\left(\frac{1}{2}\right)^{8x}. \qquad (4)$$

In the above exemplary exponential decay model (4), "x" can represent the multimedia smoothness index, and "f(x)" can represent the normalized multimedia smoothness index. Using exponential decay model (4), multimedia QoE score measurement module 206 can obtain a normalized multimedia smoothness index for determining the composite multimedia QoE metrics. The normalized multimedia smoothness index can have a value in a predetermined normalization range, such as from 0 to 100. In some embodiments, this predetermine normalization range can be the same as or similar to the range of other normalized user experience metrics. A low normalized value in the range (e.g., "0") can represent a significant stalling (and thus a significantly degraded user experience), and a high normalized value in the range (e.g., "100") can represent no stalling (and thus a better user experience). In an exponential decay model, such as exponential decay model in equation (4), the normalized multimedia smoothness index can asymptotically approach the lower normalized value (e.g., "0") as the stalling time increases relative to the media time. Additionally, in an exponential decay model, such as exponential decay model in equation (4), the normalized multimedia smoothness index approaches its half value (i.e., half-life) when the multimedia smoothness index approaches ⅛ (0.125), i.e., when the stalling time equals ⅛ of the media time. It is appreciated that the predetermine normalization range can also be any other range that is desired and multimedia QoE score measurement module 206 can also normalize multimedia smoothness index using any other model that is desired.

Multimedia QoE score measurement module 206 can also process, such as normalize, the multimedia start delay using similar exponential decay model, such as exponential decay model in equation (4). The normalized multimedia start delay can also be in a predetermined normalization range, such as from 0 to 100. In some embodiments, this predetermine normalization range can be the same as or similar to the range of other normalized user experience metrics. As an example, if the multimedia start delay is 0 second, the normalized multimedia start delay can have a high normalized value in the range (e.g., "100"), representing a better user experience. If the multimedia start delay becomes large, such as 1 second, the normalized multimedia start delay can approach a low normalized value of the range (e.g., "0"), representing a significantly degrading user experience. It is appreciated that the predetermine normalization range can also be any other range that is desired and multimedia QoE score measurement module 206 can also normalize multimedia start delay using any model that is desired. For example, if a typical multimedia start delay is more than 1 second for an Android client device, the multimedia start delay time that is normalized could take into consideration this typical delay. If the actual start delay is less than or equal to the typical start delay (e.g., 0.5 second), the normalized score could be 100.

Multimedia QoE score measurement module 206 can process, such as normalize, the multimedia quality metrics using, for example, a logarithmic transformation. As an example, multimedia QoE score measurement module 206 can normalize the multimedia bitrate by using an exemplary logarithmic transformation as:

$$f(x) = \begin{cases} 0, & \text{if } x < 16 \\ 10 \log_2\left(\frac{x}{16}\right) & \\ 100, & \text{if } x > 16384 \end{cases} \quad (5)$$

In the above exemplary logarithmic transformation of equation (5), "x" can represent the multimedia bitrate and "f(x)" can represent the normalized multimedia bitrate. As an example, the multimedia bitrate can be unbounded and can be any value from 0 to infinity. Multimedia bitrate is often measured in kilo-bit-per-second (kpbs) or mega-bit-per-second (Mpbs). Most Internet multimedia can have a multimedia bitrate rate in the range of 300-800 kbps. On the other hand, a 1080p Blue-Ray video can have a much higher multimedia bitrate that is in the range of 30-40 Mbps. The normalized multimedia bitrate can also be in a predetermined normalization range, such as from 0 to 100. In some embodiments, this predetermine normalization range can be the same as or similar to the range of other normalized user experience metrics.

As an example, in logarithmic transformation of equation (5), the normalized multimedia bitrate can have a low normalized value (e.g., "0") if the multimedia bitrate of the video falls below a first multimedia bitrate threshold such as 16 kbps; and can have a high normalized value (e.g. "100") if the multimedia bitrate reaches or exceeds a second multimedia bitrate threshold such as 16384 kbps (e.g., around 16 mbps). Moreover, within the range of the first and second multimedia bitrate threshold, the normalized multimedia bitrate can increase by a predetermined number, such as number of 10, when the multimedia bitrate doubles. It is appreciated that in the above exemplary logarithmic transformation, the first and second multimedia bitrate thresholds, and the predetermined number, can be any desired value. It is further appreciated that multimedia QoE score measurement module 206 can also normalize multimedia bitrate using any other model that is desired.

Multimedia QoE score measurement module 206 can normalize the video frame size by using an exemplary logarithmic transformation as:

$$f(x) = \begin{cases} 0, & \text{if } x < 6400 \\ 12 \log_2\left(\frac{x}{6400}\right) & \\ 100, & \text{if } x > 2073600 \end{cases} \quad (6)$$

In the above exemplary logarithmic transformation of equation (6), "x" can represent the video frame size and "f(x)" can represent the normalized video frame size. As an example, the video frame size can be unbounded and can be any value from 0 to infinity. Video frame size is often measured in number of pixels. The normalized video frame size can also have a value in a predetermined range, such as from 0 to 100. In some embodiments, this predetermine normalization range can be the same as or similar to the range of other normalized user experience metrics.

As an example, in exemplary logarithmic transformation (6), the normalized multimedia bitrate can have a low normalized value in the range (e.g. "0") if the video frame size of the video falls below a first video frame size threshold such as 6,400 pixels (i.e., 80×80); and can have a high normalized value in the range (e.g., "100") if the video frame size reaches or exceeds a second video frame size threshold such as 2,073,600 pixels (e.g., 1920×1080 or 1080p). Moreover, within the range of the first and second video frame size thresholds, the normalized video frame size can increase by a predetermined number (e.g., number of 12) when the video frame size doubles. It is appreciated that the first and second video frame size thresholds, and the predetermined number, can be any desired value. It is further appreciated that multimedia QoE score measurement module 206 can also normalize video frame size using any other model that is desired.

As another example, multimedia QoE score measurement module 206 can normalize the video frame rate by using an exemplary logarithmic transformation as:

$$f(x) = \begin{cases} 0, & \text{if } x < 2 \\ 25 \log_2\left(\frac{x}{2}\right) & \\ 100, & \text{if } x > 32 \end{cases} \quad (7)$$

In the above exemplary logarithmic transformation of equation (7), "x" can represent the video frame rate and "f(x)" can represent the normalized video frame rate. As an example, the video frame rate can be unbounded and can be any value from 0 to infinity. Video frame rate is often measured in frames per second. The normalized video frame rate can also have a value in a predetermined range, such as from 0 to 100. In some embodiments, this predetermine normalization range can be the same as or similar to the range of other normalized user experience metrics.

As an example, in logarithmic transformation of equation (7), the normalized video frame rate can have a low normalized value in the range (e.g., "0") if the video frame rate of the video falls below a first video frame rate threshold (e.g., 2 frames per second); and can have a high normalized value of the range (e.g., "100") if the video frame size reaches or exceeds a second video frame rate threshold (e.g., 32 frames per second). Moreover, within the range of first and second video frame rate thresholds, (e.g., 2 to 32 frames per second), the normalized video frame rate can increase by a predetermined number (e.g., number of 25) when the video frame rate doubles. It is appreciated that the first and second video frame rate thresholds, and the predetermined number, can be any desired value. It is further appreciated that multimedia QoE score measurement module 206 can also normalize video frame rate using any other model that is desired.

As described above, multimedia QoE score measurement module 206 can determine the composite multimedia QoE metrics, such as a composite multimedia QoE score, by using the one or more normalized user experiences metrics, such as the normalized multimedia smoothness index, normalized multimedia start delay, normalized multimedia bitrate, normalized video frame size, and normalized video frame rate. The composite multimedia QoE metrics can provide a holistic view or measurement of the overall quality of service associated with multimedia transmission via a network. The composite multimedia QoE metrics can be provided to, for example, traffic monitoring and optimization platforms, so that the quality of service associated with multimedia transmission via the network can be evaluated and/or improved.

In some embodiments, multimedia QoE score measurement module 206 can determine the composite multimedia QoE metrics by assigning a weight corresponding to the one or more normalized user experience metrics; and then computing a composite multimedia QoE score based on the one or more normalized user experience metrics and their corresponding weights. An exemplary model for determining the composite multimedia QoE metrics can be:

$$\bar{x} = \exp\left(\frac{\Sigma w_i \ln x_i}{\Sigma w_i}\right). \quad (8)$$

In the above exemplary model of equation (8), "$x_i$" can represent the normalized user experience metrics; "$w_i$" can represent the weight associated with the corresponding user experience metrics, and "$\bar{x}$" can be the weighted geometric mean, representing the composite multimedia QoE metrics, such as a composite multimedia QoE score.

Multimedia QoE score measurement module 206 can assign the weight (i.e., "$w_i$") associated with each of the corresponding user experience metrics. The assigned weight can represent the relative importance of the corresponding user experience metrics in determining the composite multimedia QoE metrics. For example, multimedia QoE score measurement module 206 can assign weight of the normalized multimedia smoothness index, the normalized multimedia start delay, the normalized multimedia bitrate, the normalized video frame size, and the normalized video frame rate to be 40%, 10%, 20%, 20% and 10%, respectively. As a result, the above exemplary assignment indicates that the normalized multimedia transmitting metrics (including, in this example, the normalized multimedia smoothness index and the normalized multimedia start delay) and the normalized multimedia quality metrics (including, in this example, the normalized multimedia bitrate, the normalized video frame size, and the normalized video frame rate) are assigned in a way that can be equally important (i.e., each is assigned 50% of weight). It is appreciated that any other desired weight can be assigned to the user experience metrics, representing a desired manner of determining the composite multimedia QoE metrics.

In exemplary model of equation (8), if any one of the normalized user experience metrics has a low value (e.g., "0"), the composite multimedia QoE metrics can be significantly degraded, thereby representing a corresponding degradation of quality of service associated with the multimedia data transmitted via the network. Moreover, a same percentage change in any one of the normalized user experience metrics can have an impact on the overall composite multimedia QoE metrics corresponding to their assigned weight. As an example, if the weights of the normalized multimedia smoothness index and the normalized multimedia start delay are assigned as 40% and 10% respectively, a 10% change of the normalized multimedia smoothness index will have a bigger impact on the composite multimedia QoE metrics than an impact caused by a 10% change of the normalized multimedia start delay. As a result, multimedia QoE score measurement module 206 can determine the composite multimedia QoE metrics (and thus the overall user experience) in a more holistic and desired manner. It is appreciated that multimedia QoE score measurement module 206 can also determine the composite multimedia QoE metrics using any other desired model.

Figure 3:
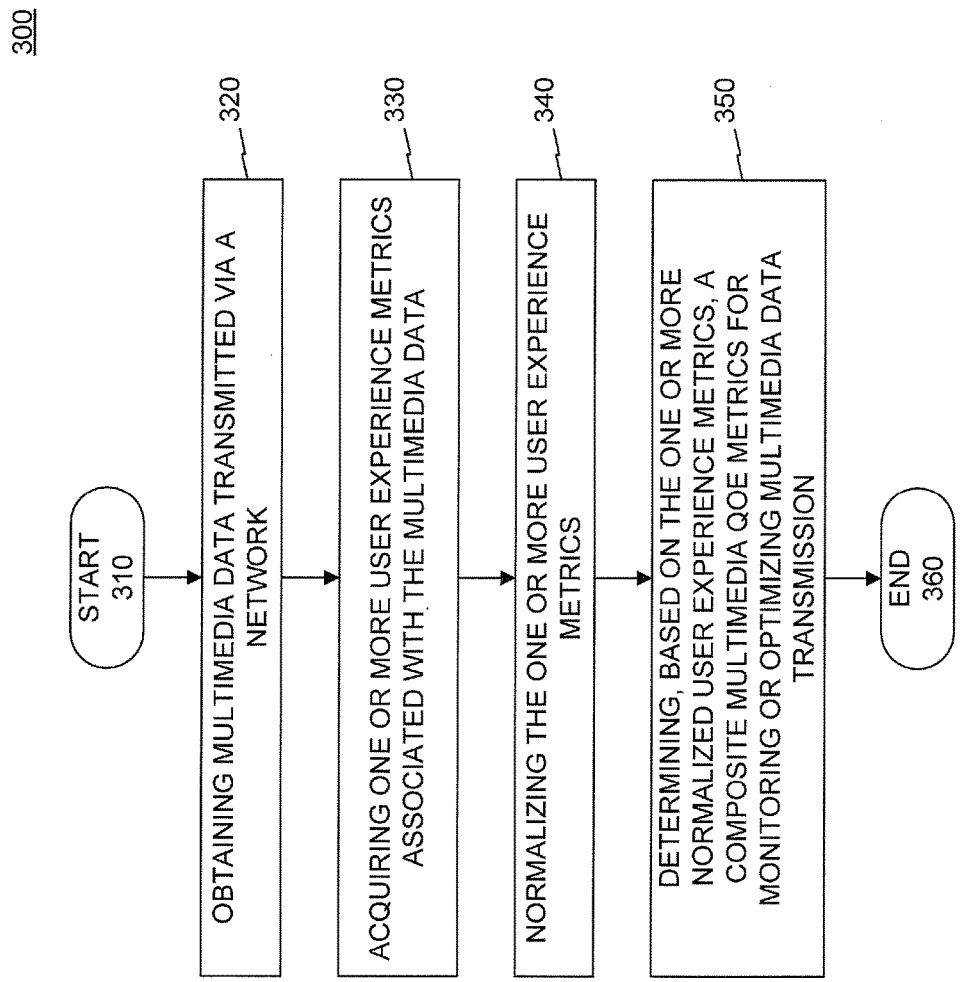
FIG. 3 is a flowchart representing an exemplary method for determining a composite multimedia QoE metrics, consistent with embodiments of the present disclosure.

FIG. 3 is a flowchart representing an exemplary method 300 for determining a composite multimedia QoE metrics. Referring to FIG. 3, it will be readily appreciated that the illustrated procedure can be altered to delete steps or further include additional steps. After initial step 310, a multimedia QoE score measurement module (e.g., multimedia QoE score measurement module 206) can obtain (320) multimedia data transmitted via the network. As described above, the multimedia data can be provided by one or more content servers after the one or more content servers receive requests from one or more client devices or it can be provided by an optimization server that processed the multimedia data received from the one or more content servers. The multimedia data can also be provided by a cache that is associated with the content server, the optimization server, or an access network. A data processing module (e.g., data processing module 202) can be responsible for routing data traffic and handling packets between the one or more client devices and the one or more content servers. For example, the data processing module can process multimedia data that is transmitted through the network. The data processing module can also perform multimedia data processing such as video compression, filtering, frame rate conversion, noise reduction, etc. The data processing module can also store the multimedia data, either processed or unprocessed, in a transaction history database (e.g., transaction history database 204). After the multimedia data is stored in the transaction history database, the multimedia QoE score measurement module can obtain, such as by retrieving or requesting, the stored multimedia data from the transaction history database.

After obtaining the multimedia data, the multimedia QoE score measurement module can acquire (330) one or more user experience metrics associated with the multimedia data. The user experience metrics includes at least one multimedia transmitting metrics and one multimedia quality metrics. As described above, the multimedia QoE score measurement module can acquire, for example by computing, user experience metrics associated with multimedia data. In some embodiments, the multimedia QoE score measurement module can also acquire the user experience metrics associated with the multimedia data requested by a client device, multimedia data transmitted during a time period to a client device, or multimedia data transmitted to one or more client devices that use a same service provider, or multimedia data transmitted to any other combination of one or more client devices, groups, or service providers.

As described above, the multimedia QoE score measurement module can acquire the user experience metrics, which can include, among other things, multimedia transmitting metrics and multimedia quality metrics. The multimedia QoE score measurement module can also acquire the multimedia quality metrics, which can include, for example, the multimedia bitrate, the video frame size, and the video frame rate. The details of the acquiring of various user experience metrics are described below.

After acquiring the one or more user experience metrics associated with the multimedia data, the multimedia QoE score measurement module can normalize (340) the one or more user experience metrics. As described above, the multimedia QoE score measurement module can normalize the one or more user experience metrics in a balanced manner. As an example, the multimedia QoE score measurement module can normalize the one or more user experience metrics such that no one individual user experience metrics can influence the composite multimedia QoE metrics in an undesired way. That is, the impact of any one user experience metrics is limited so that the composite multimedia QoE metrics represents a holistic view of the quality of service associated with the multimedia transmission via the network. The multimedia QoE score measurement module can also normalize the one or more user experience metrics such that the one or more user experience metrics is limited within a predetermined range that can be readily interpreted or used. For example, the multimedia QoE score measurement module can normalize the one or more user experience metrics such that they all have a value in a predetermined range from 0 to 100. The details of the normalization of the user experience metrics are described in detail below. The normalized user experience metrics can also be stored, for example, in the transaction history database.

After normalizing the one or more user experience metrics, the multimedia QoE score measurement module can determine (350) a composite multimedia QoE metrics based on the one or more normalized user experience metrics. As described above, the composite multimedia QoE metrics can provide a holistic view or measurement of the overall quality of service associated with multimedia transmission via the network. The composite multimedia QoE metrics can be provided to, for example, traffic monitoring and optimization platforms, so that the quality of service for associated with multimedia transmission via the network can be evaluated and/or improved. In some embodiments, the composite multimedia QoE metrics can be a score. The detail of determining the composition multimedia QoE metrics is described below. After determining the composite multimedia QoE metrics, method 300 can proceed to an end (360). It is appreciated that method 300 can also be repeated any number of times as desired. For example, method 300 can be repeated after the multimedia QoE score measurement module obtains new multimedia data.

Figure 4:
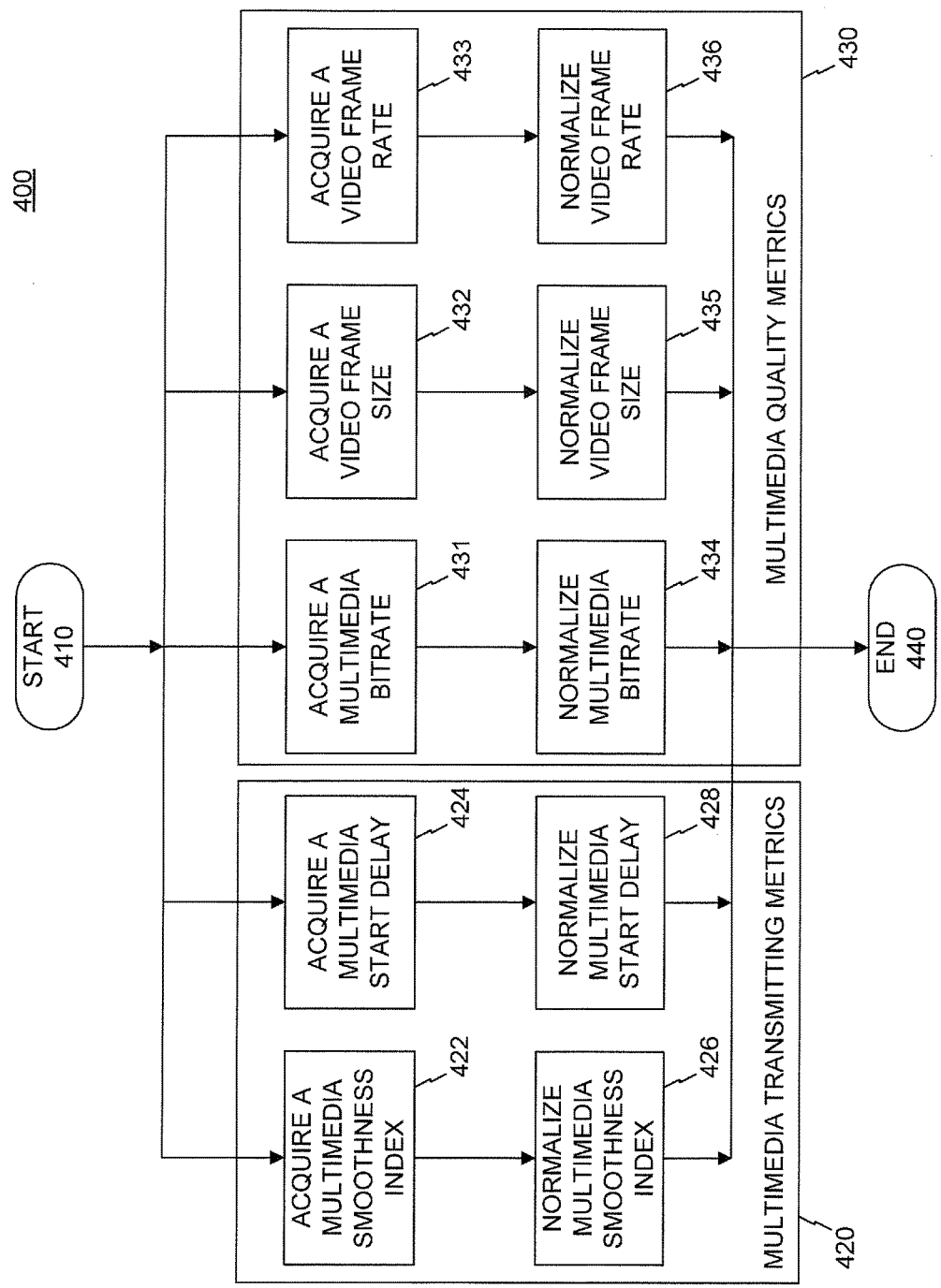
FIG. 4 is a flowchart representing an exemplary method for acquiring and normalizing one or more user experience metrics associated with the multimedia data, consistent with embodiments of the present disclosure.

FIG. 4 is a flowchart representing an exemplary method 400 for acquiring and normalizing one or more user experience metrics associated with the multimedia data. After an initial step 410, the multimedia QoE score measurement module can proceed to acquire one or more of multimedia smoothness index (422), a multimedia start delay (424), a multimedia bitrate (431), a video frame size (432), and a video frame rate (433). In some embodiments, the multimedia QoE score measurement module can first acquire the multimedia smoothness index (422) and multimedia start delay (424), and then acquire the multimedia bitrate (431), the video frame size (432), and the video frame rate (433), or vice versa. In some embodiments, the multimedia QoE score measurement module can acquire one or more of the above user experience metrics in parallel. It is appreciated that the multimedia QoE score measurement module can acquire the one or more user experience metrics in any order that is desired.

The multimedia QoE score measurement module can acquire (422) the multimedia smoothness index. The multimedia smoothness index measures the stalling time relative to the media time of the multimedia data. As an example, the multimedia smoothness index can be acquired by measuring the stalling time relative to the media time of the multimedia data. The stalling time can be computed based on the elapsed time and the media time of the exemplary equation (1). As an example, if the media time is greater than or equal to the elapsed time, the stalling time can be assigned a pre-determine value, such as "0." A stalling time of "0" can indicate that no stalling occurred for playing the multimedia data at the client device. If the media time is less than the elapsed time, the stalling time can equal the difference between the elapsed time and the media time (i.e., stalling time=elapsed time−media time). The multimedia smoothness index can then be acquired, for example, as the ratio of the stalling time and the media time, as shown in the exemplary equation (2).

The multimedia QoE score measurement module can obtain, for example, the elapsed time and the media time, by obtaining and/or processing the multimedia data, the transactional events, and/or parameters that are stored in the transaction history database. As described above, the multimedia data, the elapsed time, the media time, and any other desired parameters can be obtained, by the multimedia QoE score measurement module, from the communication between the one or more client devices and the one or more content servers.

The multimedia QoE score measurement module can also acquire (424) the multimedia start delay. The multimedia start delay can be the delay from the time client device requests the multimedia data to the time the client device starts to render or play the requested multimedia data, i.e., the amount of time between the client device receiving a play input to the time that the multimedia data is actually played. In some embodiments, the multimedia start delay can be acquired by, for example, measuring the amount of time for transmitting multimedia data having a fixed amount of media time. Typically, the client device can start to play the multimedia data after it receives a portion of it. As an example, after the client device requests multimedia data having a 5 minutes media time, it can start playing after receiving a portion of the requested multimedia data (e.g., 5 or 10 seconds media time). The multimedia start delay can be in a range, for example, from 0 to 1 second. In some embodiments, the multimedia start delay can be client-device specific. For example, an Android-based device may have a different multimedia start delay from an iPhone-based device. As described above, relevant timing information for acquiring the multimedia start delay can also be obtained, by the multimedia QoE measurement system, from the communication between one or more client devices and one or more content servers. The obtained information can be stored in the transaction history database. The multimedia QoE score measurement module can then obtain the stored information from the transaction history database for acquiring the multimedia start delay.

The multimedia QoE score measurement module can acquire (431) the multimedia bitrate. The multimedia bitrate can be the average data rate for the client device to play the multimedia data in real time. The multimedia bitrate can be acquired, for example, by dividing the size of the received multimedia data (e.g., multimedia data in number of bytes) received at the client device by the media time, as shown in exemplary equation (3). The size of the received multimedia data and the media time can be obtained, by the multimedia QoE measurement system, from the communication between the one or more client devices and the one or more content servers. The obtained information can also be stored in the transaction history database. The multimedia QoE score measurement module can then obtain the stored information from the transaction history database for acquiring the multimedia bitrate.

The multimedia QoE score measurement module can acquire (432) the video frame size from data provided by one or more content servers, or if optimization is involved, by an optimization server (which may also provide the multimedia QoE measurement system). The video frame size can be the total number of pixels in a single video frame. A video frame can be measured, for example, by the product of the width and the height of the video frame. The video frame rate can be the number of video frames transmitted to the client device in a unit time (e.g., per second). In some embodiments, the video frame size is the actual number of pixels in a video frame, i.e., the actual product of the width and height of the video frame, and is not limited to the commonly used video frame sizes. The width and the height of the video frame, and any other desired parameters, can be obtained, by the multimedia QoE measurement system, from the communication between one or more client devices and one or more content servers. The obtained information can also be stored in the transaction history database. The multimedia QoE score measurement module can then obtain the stored information from the transaction history database for acquiring the video frame size.

The multimedia QoE score measurement module can acquire (433) the video frame rate. The video frame rate can be acquired by, for example, obtaining the fixed video frame rate of the multimedia data, or computing an average video frame rate in cases where the video frame rate of the vide data is a variable. The fixed video frame rate or the varying video frame rate, and any other desired parameters, can be obtained, by the multimedia QoE measurement system, from the communication between one or more client devices and one or more content servers. The obtained information can also be stored in the transaction history database. The multimedia QoE score measurement module can then obtain the stored information from the transaction history database for acquiring the video frame rate.

After the multimedia QoE score measurement module acquires one or more of the user experience metrics as described above, the multimedia QoE score measurement module can proceed to normalize the multimedia smoothness index (426), the multimedia start delay (428), the multimedia bitrate (434), the video frame size (435), and the video frame rate (436). In some embodiments, the multimedia QoE score measurement module can first normalize the multimedia smoothness index (426) and the multimedia start delay (428), and then normalize the multimedia bitrate (434), the video frame size (435), and the video frame rate (436), or vice versa. In some embodiments, the multimedia QoE score measurement module can normalize the one or more user experience metrics in parallel. It is appreciated that the multimedia QoE score measurement module can normalize the one or more user experience metrics in any other order that is desired.

The multimedia QoE score measurement module can normalize (426) the multimedia smoothness index using, for example, an exponential decay model, such as exponential decay model in equation (4) shown above. The normalized multimedia smoothness index can have a value in a predetermined normalization range, such as from 0 to 100. In some embodiments, this predetermine normalization range can be the same as or similar to the range of other normalized user experience metrics. A low normalized value in the range (e.g., "0") can represent a significant video stalling (and thus a significantly degraded user experience), and a high normalized value in the range (e.g., "100") can represent no stalling (and thus a better user experience). In an exponential decay model, such as exponential decay model of equation (4), the normalized multimedia smoothness index can asymptotically approach the lower normalized value (e.g., "0") as the stalling time increases relative to the media time. Additionally, in an exponential decay model, such as exponential decay model (4), the normalized multimedia smoothness index approaches its half value (i.e., half-life) when the multimedia smoothness index approaches ⅛ (0.125), i.e., when the stalling time equals ⅛ of the media time. It is appreciated that the predetermine normalization range can also be any other range that is desired and the multimedia QoE score measurement module can also normalize multimedia smoothness index using any other model that is desired.

The multimedia QoE score measurement module can also normalize (428) the multimedia start delay using a similar exponential decay model, such as the exponential decay model of equation (4). The normalized multimedia start delay can also be in a predetermined normalization range, such as from 0 to 100. In some embodiments, this predetermine normalization range can be the same as or similar to the range of other normalized user experience metrics. As an example, if the multimedia start delay is 0 second, the normalized multimedia start delay can have a high normalized value in the range (e.g., "100"), representing a better user experience. If the multimedia start delay becomes large, such as 1 second, the normalized multimedia start delay can approach a low normalized value of the range (e.g., "0"), representing a significantly degrading user experience. It is appreciated that the predetermine normalization range can also be any other range that is desired and the multimedia QoE score measurement module can also normalize multimedia start delay using any model that is desired. For example, if a typical multimedia start delay is more than 1 second for an Android client device, the multimedia start delay time that is normalized could take into consideration this typical delay. If the actual start delay is less than or equal to the typical start delay (e.g., 0.5 second), the normalized score could be 100.

The multimedia QoE score measurement module can also normalize (434) the multimedia bitrate using a logarithmic transformation, such as logarithmic transformation of equation (5) shown above. The normalized multimedia bitrate can also be in a predetermined normalization range, such as from 0 to 100. In some embodiments, this predetermine normalization range can be the same as or similar to the range of other normalized user experience metrics. As an example, in logarithmic transformation of equation (5) the normalized multimedia bitrate can have a low normalized value (e.g., "0") if the multimedia bitrate of the video falls below a first multimedia bitrate threshold such as 16 kbps; and can have a high normalized value (e.g. "100") if the multimedia bitrate reaches or exceeds a second multimedia bitrate threshold such as 16384 kbps (e.g., around 16 Mbps). Moreover, within the range of the first and second multimedia bitrate threshold, the normalized multimedia bitrate can increase by a predetermined number, such as number of 10, when the multimedia bitrate doubles. It is appreciated that in the above exemplary logarithmic transformation, the first and second multimedia bitrate thresholds, and the predetermined number, can be any desired value. It is further appreciated that the multimedia QoE score measurement module can also normalize multimedia bitrate using any other model that is desired.

The multimedia QoE score measurement module can also normalize (435) the video frame size using a logarithmic transformation, such as logarithmic transformation of equation (6) shown above. The normalized video frame size can also have a value in a predetermined range, such as from 0 to 100. In some embodiments, this predetermine normalization range can be the same as or similar to the range of other normalized user experience metrics. As an example, the normalized multimedia bitrate can have a low normalized value in the range (e.g. "0") if the video frame size of the video falls below a first video frame size threshold such as 6,400 pixels (i.e., 80×80); and can have a high normalized value in the range (e.g., "100") if the video frame size reaches or exceeds a second video frame size threshold such as 2,073,600 pixels (e.g., 1920×1080 or 1080p). Moreover, within the range of the first and second video frame size thresholds, the normalized video frame size can increase by a predetermined number (e.g., number of 12) when the video frame size doubles. It is appreciated that the first and second video frame size thresholds, and the predetermined number, can be any desired value. It is further appreciated that the multimedia QoE score measurement module can also normalize video frame size using any other model that is desired.

The multimedia QoE score measurement module can also normalize (436) the video frame rate using a logarithmic transformation, such as logarithmic transformation of equation (7) shown above. The normalized video frame rate can also have a value in a predetermined range, such as from 0 to 100. In some embodiments, this predetermine normalization range can be the same as or similar to the range of other normalized user experience metrics. As an example, in logarithmic transformation of equation (7), the normalized video frame rate can have a low normalized value in the range (e.g., "0") if the video frame rate of the video falls below a first video frame rate threshold (e.g., 2 frames per second); and can have a high normalized value of the range (e.g., "100") if the video frame size reaches or exceeds a second video frame rate threshold (e.g., 32 frames per second). Moreover, within the range of first and second video frame rate thresholds, (e.g., 2 to 32 frames per second), the normalized video frame rate can increase by a predetermined number (e.g. number of 25) when the video frame rate doubles. It is appreciated that the first and second video frame rate thresholds, and the predetermined number, can be any desired value. It is further appreciated that the multimedia QoE score measurement module can also normalize video frame rate using any other model that is desired.

After the multimedia QoE score measurement module normalizes the one or more user experience metrics, it can proceed to an end 440. It is appreciated that method 400 can also be repeated any number of times as desired. For example, method 400 can be repeated after the multimedia QoE score measurement module obtains new multimedia data.

Figure 5:
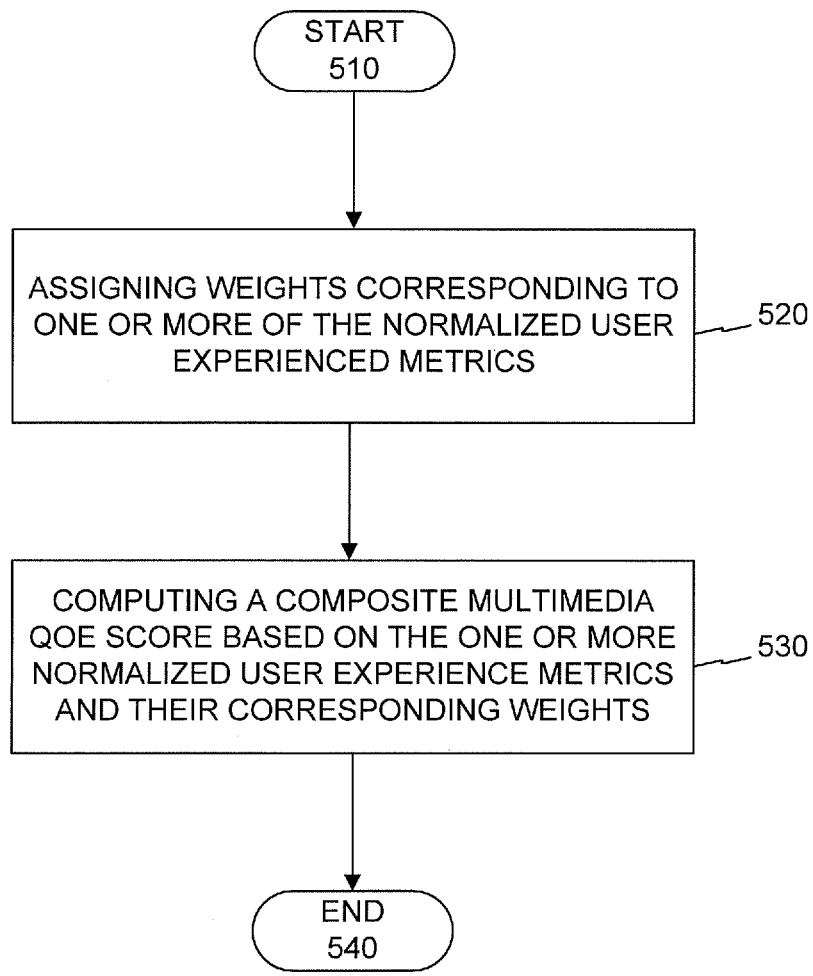
FIG. 5 is a flowchart representing an exemplary method for determining a composite multimedia QoE metrics, consistent with embodiments of the present disclosure.

FIG. 5 is a flowchart representing an exemplary method 500 for determining a composite multimedia QoE metrics. The multimedia QoE score measurement module can determine the composite multimedia QoE metrics, such as a composite multimedia QoE score, by using the one or more normalized user experiences metrics, such as the normalized multimedia smoothness index, the normalized multimedia start delay, the normalized multimedia bitrate, the normalized video frame size, and the normalized video frame rate. After an initial step 510, the video score QoE measurement module can assign (520) weights corresponding to one or more of the normalized user experience metrics. The assigned weight can represent the relative importance of the corresponding user experience metrics in determining the composite multimedia QoE metrics. For example, the multimedia QoE score measurement module can assign weight of the normalized multimedia smoothness index, the normalized multimedia start delay, the normalized multimedia bitrate, the normalized video frame size, and the normalized video frame rate to be 40%, 10%, 20%, 20% and 10%, respectively. As a result, the above exemplary assignment indicates that the normalized multimedia transmitting metrics (including, in this example, the normalized multimedia smoothness index and normalized the multimedia start delay) and the normalized multimedia quality metrics (including, in this example, the normalized multimedia bitrate, the normalized video frame size, and the normalized video frame rate) are assigned in a way that can be equally important (i.e., each is assigned 50% of weight). It is appreciated that any other desired weight can be assigned to the user experience metrics, representing a desired manner of determining the composite multimedia QoE metrics.

After assigning the weights corresponding to the one or more normalized user experience metrics, the multimedia QoE score measurement module can compute (530) a composite multimedia QoE score based on the one or more normalized user experience metrics and their corresponding weights by using, for example, a weighted geometric mean model, such as the weighted geometric mean model of equation (8). By using the weighted geometric mean model, if any one of the normalized user experience metrics has a low value (e.g., "0"), the composite multimedia QoE metrics can be significantly degraded, thereby representing a corresponding degradation of quality of service associated with the multimedia data transmitted via the network. Moreover, a same percentage change in any one of the normalized user experience metrics can have an impact on the overall composite multimedia QoE metrics corresponding to their assigned weight. As an example, if the weights of the normalized multimedia smoothness index and the normalized multimedia start delay are assigned as 40% and 10% respectively, a 10% change of the normalized multimedia smoothness index will have a bigger impact on the composite multimedia QoE metrics than an impact caused by a 10% change of the normalized multimedia start delay. As a result, the multimedia QoE score measurement module can determine the composite multimedia QoE metrics (and thus the overall user experience) in a more holistic and desired manner. It is appreciated that the multimedia QoE score measurement module can also determine the composite multimedia QoE metrics using any other desired model. Furthermore, the composition multimedia QoE metrics can be a single metric (e.g., a score), or a plurality of metrics. For example, in some embodiments, assigning step 520 and computation step 530 are eliminated altogether and the normalized scores for each of the user experience metrics are provided.

The methods disclosed herein may be implemented as a computer program product, i.e., a computer program tangibly embodied in an information carrier, e.g., in a non-transitory machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as one or more modules, one or more components, one or more subroutines, or one or more other units suitable for use in a computing environment. A computer program can be deployed to be executed on one computer or on multiple computers at one site or distributed across multiple sites and interconnected by a communication network.

In the preceding specification, the subject matter has been described with reference to specific exemplary embodiments. It will, however, be evident that various modifications and changes may be made without departing from the broader spirit and scope of the subject matter as set forth in the claims that follow. The specification and drawings are accordingly to be regarded as illustrative rather than restrictive. Other embodiments may be apparent to those skilled in the art from consideration of the specification and practice of the embodiments disclosed herein.

What is claimed is:

1. A method for operating an adaptive traffic manager for a multimedia network, the method comprising:
   receiving multimedia data associated with multimedia transmitted via the multimedia network;
       acquiring metrics associated with the multimedia data, wherein the metrics includes at least one multimedia transmitting metrics and at least one multimedia quality metrics, wherein the multimedia transmitting metrics comprise a multimedia smoothness index obtained using a stalling time and a media time, wherein the stalling time represents the difference between an elapsed time of the multimedia and the media time;
   normalizing the metrics; and
   determining, based on the normalized metrics, the composite multimedia QoE metrics
   providing, based on the composite multimedia QoE metrics, one or more traffic management optimization rules to be applied to the multimedia data so as to increase user experience when presented with the multimedia data.

2. The method of claim 1, wherein normalizing the metrics comprises normalizing the multimedia transmitting metrics using an exponential decay model.

3. The method of claim 1, wherein the multimedia quality metrics comprises at least one of:
   a multimedia bitrate obtained using the size of the multimedia data and a media time;
   a video frame size representing the number of pixels in a video frame of the multimedia data; and
   a video frame rate representing a number of video frames transmitted in a unit time period associated with the multimedia data.

4. The method of claim 3, wherein normalizing the metrics comprises normalizing the multimedia quality metrics using a logarithmic transformation.

5. The method of claim 1, wherein the normalized metrics has a predetermined range.

6. The method of claim 1, wherein the determining of the composite multimedia QoE metrics based on the normalized metrics comprises:
   assigning weights corresponding to the normalized metrics; and
   computing a composite multimedia QoE score based on the-normalized metrics and their corresponding weights.

7. The method of claim 6, wherein the computing a composite multimedia QoE score based on the normalized metrics and their corresponding weights comprises computing the composite multimedia QoE score using a weighted geometric mean model.

8. The method of claim 1, wherein the multimedia transmitting metrics further comprises a multimedia start delay obtained using a time delay for playing the video at a client device.

9. An adaptive traffic manager for a multimedia network comprising:
   a traffic processing unit configured to receive multimedia data associated with multimedia transmitted via the multimedia network;
   a multi-media Quality of Experience (QoE) measurement system comprising:
       one or more data storage components configured to store normalized metrics associated with the obtained multimedia data, wherein the normalized metrics include at least one normalized multimedia transmitting metrics and at least one normalized multimedia quality metrics and wherein the normalized multimedia transmitting metrics correspond to multimedia transmitting metrics associated with the obtained multimedia data, the multimedia transmitting metrics comprise a multimedia smoothness index obtained using a stalling time and a media time, wherein the stalling time represents the difference between an elapsed time of the multimedia and the media time; and
       one or more processors configured to determine, based on the normalized metrics, the composite multimedia QoE metrics; and
   a traffic management rules engine configured to provide, based on the composite multimedia QoE metrics, one or more traffic management optimization rules to be applied to the multimedia data so as to increase user experience when presented with the multimedia data.

10. The apparatus of claim 9, wherein the normalized multimedia quality metrics correspond to multimedia quality metrics associated with the obtained multimedia data, the multimedia quality metrics comprise at least one of:
    a multimedia bitrate obtained using the size of the multimedia data and a media time;
    a video frame size representing the number of pixels in a video frame of the multimedia data; and
    a video frame rate representing a number of video frames transmitted in a unit time period associated with the multimedia data.

11. The apparatus of claim 9, wherein the multimedia transmitting metrics further comprises a multimedia start delay obtained using a time delay for playing the video at a client device.

12. A non-transitory computer readable storage medium storing a set of instructions that are executable by an adaptive traffic manager for a multimedia network to cause the adaptive traffic manager to perform steps comprising:
    receiving multimedia data associated with multimedia transmitted via the multimedia network;
        acquiring metrics associated with the multimedia data, wherein the includes at least one multimedia transmitting metrics and at least one multimedia quality metrics and wherein the multimedia transmitting metrics comprise a multimedia smoothness index obtained using a stalling time and a media time, wherein the stalling time represents the difference between an elapsed time of the multimedia and the media time;
    normalizing the metrics; and
    determining, based on the normalized metrics, the composite multimedia QoE metrics
    providing, based on the composite multimedia QoE metrics, one or more traffic management optimization rules to be applied to the multimedia data so as to increase user experience when presented with the multimedia data.

13. The computer readable storage medium of claim 12, wherein normalizing the metrics comprises normalizing the multimedia transmitting metrics using an exponential decay model.

14. The computer readable storage medium of claim 12, wherein the multimedia quality metrics comprises at least one of:
   a multimedia bitrate obtained using the size of the multimedia data and a media time;
   a video frame size representing the number of pixels in a video frame of the multimedia data; and
   a video frame rate representing a number of video frames transmitted in a unit time period associated with the multimedia data.

15. The computer readable storage medium of claim 14, wherein normalizing the metrics comprises normalizing the multimedia quality metrics using a logarithmic transformation.

16. The computer readable storage medium of claim 12, wherein the normalized metrics has a predetermined range.

17. The computer readable storage medium of claim 12, wherein the determining of the composite multimedia QoE metrics based on the normalized metrics comprises:
   assigning weights corresponding to the normalized metrics; and
   computing a composite multimedia QoE score based on the normalized metrics and their corresponding weights.

18. The computer readable storage medium of claim 17, wherein the computing a composite multimedia QoE score based on the normalized metrics and their corresponding weights comprises computing the composite multimedia QoE score using a weighted geometric mean model.

19. The computer readable storage medium of claim 12, wherein the multimedia transmitting metrics further comprises a multimedia start delay obtained using a time delay for playing the video at a client device.

* * * * *